United States Patent [19]

Rockenfeller et al.

[11] Patent Number: 4,930,963

[45] Date of Patent: Jun. 5, 1990

[54] DRIVEN TUBULAR WALL-PLUG ANCHORING ELEMENT FOR LIGHT AND POROUS CONCRETE

[75] Inventors: Gottfried Rockenfeller; Uwe Rockenfeller, both of Hilchenbach, Fed. Rep. of Germany

[73] Assignee: Rockenfeller KG, Hilchenbach, Fed. Rep. of Germany

[21] Appl. No.: 281,834

[22] Filed: Dec. 8, 1988

[30] Foreign Application Priority Data

May 17, 1988 [DE] Fed. Rep. of Germany ....... 3816661

[51] Int. Cl.$^5$ ............................................. F16B 13/06
[52] U.S. Cl. ....................................... 411/44; 411/54; 411/57; 411/357
[58] Field of Search ..................................... 411/29–33, 411/44, 57, 59, 60, 61, 75, 78–80, 357–359, 447, 448, 922

[56] References Cited

U.S. PATENT DOCUMENTS

| | | | |
|---|---|---|---|
| 1,118,544 | 11/1914 | Galligan | 411/29 |
| 1,716,888 | 6/1929 | Griffith | 411/448 X |
| 2,314,445 | 3/1943 | DuVall | 411/44 |
| 3,022,701 | 2/1962 | Potruch | 411/57 |
| 4,235,150 | 11/1980 | Nony | 411/908 X |
| 4,533,288 | 8/1985 | Rivkin et al. | 411/448 X |

FOREIGN PATENT DOCUMENTS

| | | | |
|---|---|---|---|
| 2435152 | 2/1976 | Fed. Rep. of Germany | 411/44 |
| 3603134 | 9/1986 | Fed. Rep. of Germany | . |
| 430523 | 8/1911 | France | 411/357 |
| 18680 | of 1899 | United Kingdom | 411/357 |
| 800502 | 8/1958 | United Kingdom | 411/60 |

Primary Examiner—Gary L. Smith
Assistant Examiner—Jerry Redman
Attorney, Agent, or Firm—Herbert Dubno

[57] ABSTRACT

A wall plug anchor assembly is provided including a sleeve, a spherical body for flaring anchoring ends of the sleeve which body is inserted from a head end of the sleeve into an unslotted portion thereof, and a driver. By means of the driver, the spherical body is forced forward against concrete material which has entered into the sleeve interior. The operative end of the driver includes a wedge surface by and over which the spherical body can be laterally displaced away from a central axis of the sleeve in a direction of the sleeve walls in a wedge-induced or clamping movement.

15 Claims, 2 Drawing Sheets

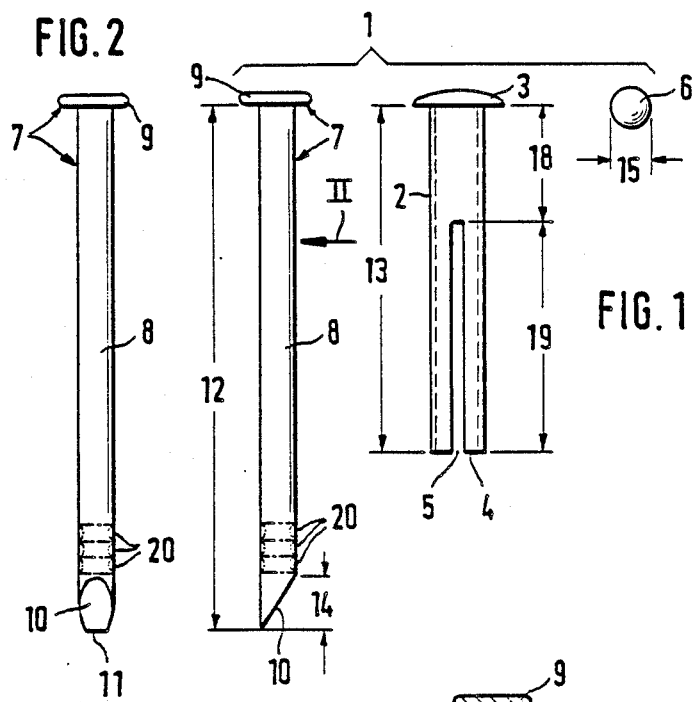
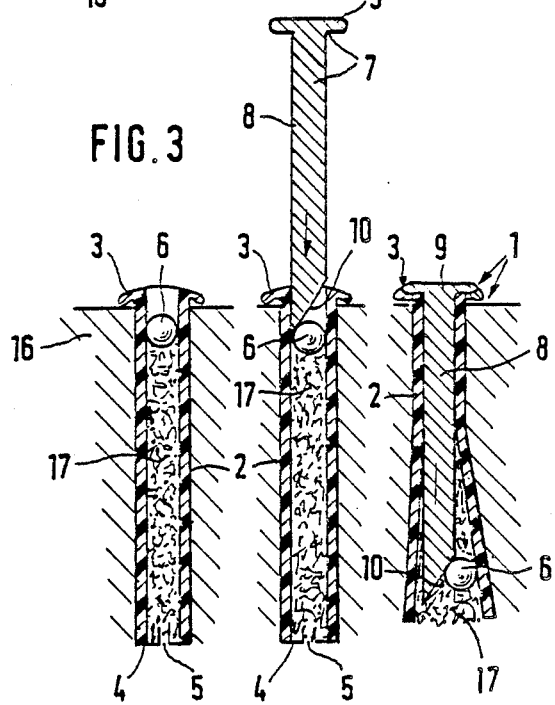

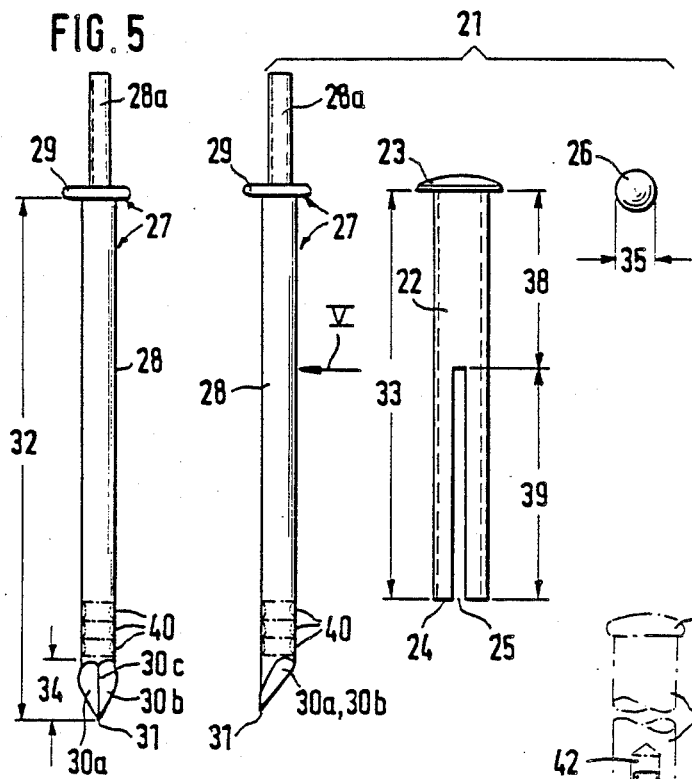
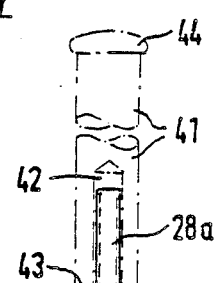
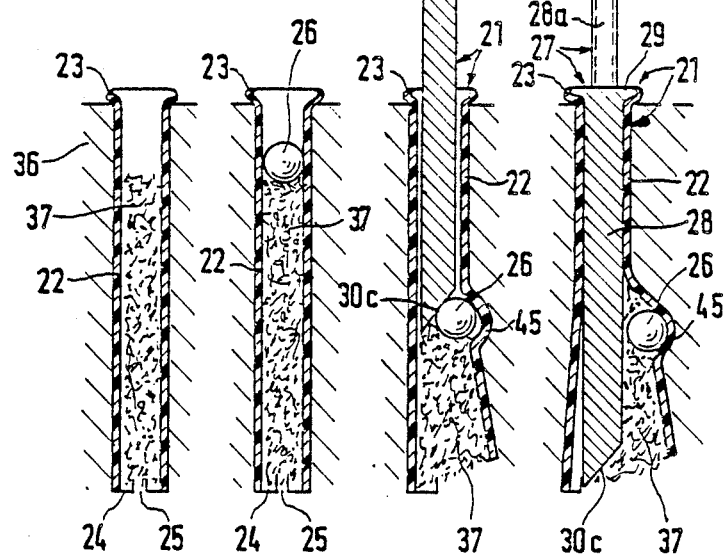

DRIVEN TUBULAR WALL-PLUG ANCHORING ELEMENT FOR LIGHT AND POROUS CONCRETE

CROSS-REFERENCE TO RELATED APPLICATION

This application is related to our concurrently filed copending application Ser. No. 07/278,019. Reference may be had to the following prior contributions in this field:
U.S. Pat. No. 4,572,720 issued 25 Feb. 1986;
U.S. Pat. No. 4,706,345 issued 17 Nov. 1987.
U.S. Pat. No. 4,718,802 issued 12 Jan. 1988; and
U.S. Pat. No. 4,727,694 issued 1 Mar. 1988.

FIELD OF THE INVENTION

Our present invention relates to a tubular wall plug anchoring element which can be inserted into aerated or porous concrete, light-duty concrete, and like compositions.

More particularly, this invention relates to a driven wall plug or anchor assembly, which includes a sleeve having a plurality of longitudinal slots, but leaving longitudinal wall portions or legs. The sleeve has a head or crown which has a diameter which is greater than the outer diameter of the remainder of the sleeve. The sleeve can be of a metallic material, for example steel, but can also be made of a plastic or synthetic-resin material, such as for example polyamide.

The wall plug anchor assembly also includes a body adapted to spread the longitudinal wall portions or legs of the sleeve, so as to embed and anchor them in the concrete material into which the anchor is driven.

BACKGROUND OF THE INVENTION

A wall plug anchor assembly of this type has been described, for example, in German Laid-Open Patent Publication No. 36 03 134.

In the known dowel, the sleeve body is provided by a thin-walled piece of pipe or tubing, and the head end is fashioned by a conically or outwardly flared portion. At least two diametrically arranged slots extend from the tail or foot end of this wall plug anchor assembly and thence substantially over the full length of the sleeve body.

The particular body which serves to spread or flare the legs outwardly is a sphere which is positioned at or in the tail end, i.e. the end opposite the flared end or crown of the dowel. This sphere has a diameter which is greater than the inner diameter of the sleeve body.

The known tubular wall plug anchor assembly can easily be driven, i.e. without pre-drilling of holes, into the wall material, such as gas-expanded, expanded or foam concrete, light concrete and the like as may be used in pre-formed products, such as bricks, blocks, or plates made of such concrete material.

During the driving-in process, the sphere is pressed in rearward direction towards the head and, consequently, the legs of the sleeve body are spread apart or flared and create an anchoring effect in the surrounding material.

The positive anchoring effect achieved by the flared sleeve portions of the known tubular wall plug anchor assembly during the spreading movement of the sphere is for most purposes sufficient. However, it has been found that the penetration or advance of the sphere, which acts as the spreading or widening body, is not always uniform, and is predominantly a function of the density of the material into which the wall plug anchor assembly is driven.

In the case of a relative high density of the gas-expanded or light concrete or like material, a larger penetration is achieved as well as a wider angle or flaring of the sleeve portions or legs. In the case of a lesser density one can achieve only a lesser penetration with the body causing the spreading, i.e. the sphere, in the slotted longitudinal section of the sleeve. Accordingly, a lesser degree of spreading of the respective legs is experienced.

DE-OS No. 36 03 134 accordingly suggests that in order to achieve the optimum penetration depth of the spreading body into the slotted portion of the sleeve, independently of the density of the surrounding material into which the wall plug anchor assembly is to be driven, the sphere, or in its place a spreading cone, be furnished with a female screw-thread. Into this is then screwed the male or exterior screw-thread on the shaft of a screw or bolt which acts as support element and which includes a head which can abut as a shoulder or annular support against the head end of the tubular portion of the dowel.

Thus, the known wall plug anchor assembly can be forced or driven substantially directly into the gas-expanded or light concrete and the like material, by directly applying hammer strokes on the head of the bolt which serves as the support element, initially without any flaring of the leg portions. Subsequently, by turning of the bolt, the spreading body, i.e. the sphere or the spreading cone in its place, is advanced in, or pulled into, the slotted region of the sleeve body, and this is then spread or flared to the desired extent to attain the desired anchoring effort.

One disadvantage of a tubular wall plug anchor assembly according to this prior art, however, arises from the subsequently additionally required turning action for moving the bolt, following the required actual driving-in or penetration action, to advance in the concrete material that is at hand to anchor the dowel.

OBJECTS OF THE INVENTION

It is, therefore, the principal object of the present invention to provide an anchor or wall plug anchor assembly of the type described which obviates the disadvantages and problems of the prior art.

It is also an object of the invention to provide a fastener or anchor which achieves optimum retention forces in the surrounding material.

SUMMARY OF THE INVENTION

These and other objects of the invention are attained by a wall plug anchor assembly or anchor which can be inserted into the surrounding material. The plug anchor assembly includes a sleeve with slotted portions which can be moved to flare or laterally extend into the surrounding material by strokes. This is achieved independently of the density of the surrounding material into which the wall plug anchor assembly penetrates and with considerable extraction resistance of the wall plug anchor assembly.

In accordance with one important feature of the invention, there is provided a wall plug anchor assembly which includes the sphere or spreading body which is inserted at the head end of the sleeve into the unslotted or solid portion thereof.

There is also provided a rod-like driver, which serves to move the sphere against the concrete material which may have entered into the sleeve from the solid portion to the slotted portion. The end of the driver can force the sphere with a wedge surface which serves, at least in the slotted portion of the sleeve, to laterally displace the sphere away from the central longitudinal axis of the sleeve in the direction of the sleeve walls by way of a wedge-induced movement.

It has been found that this arrangement or assembly is effective for concrete materials of varying densities, such as gas-expanded light concrete, and like materials, to achieve a flaring or spreading of the slotted portion of the sleeve body of the dowel, with the flaring being a function of the diameter or cross section of the sphere, in addition to the cross-sectional dimension of the driver. The achievable retention values of the wall plug anchor assembly in accordance with the invention are accordingly only a function of the strength (i.e. compressive strength) of the respective concrete composition, e.g. gas-expanded or light concrete and the like, and are optimally adapted to the particular composition.

It has also been found advantageous that the sphere is correlated to the inner diameter of the sleeve by a small radial clearance or play, and that the wedge surface of the driver extends at least over one-half of the cross section or diameter thereof.

In this manner, the respective displacement of the sphere by means of the driver, initially is achieving a compaction of the concrete material which can have entered into cavity, or unslotted portion, of the sleeve in the direction of the slotted portion of the sleeve. Upon attaining a low-level or minimum compaction, the wedge surface of the driver enters gradually between the sphere and the interior wall of the sleeve and causes a flaring, in radial direction, of the slotted sleeve portion or legs. This flaring action increases, of course, on further advancement of the driver. The final extent of flaring or spreading is reached when the full diameter or cross-sectional extent of the sphere and the full cross-sectional extent of the driver are aligned alongside one another within the confines of the sleeve.

It is also of advantage that the wall plug anchor assembly has a driver having an outer diameter which is very close to that of the inner diameter of the sleeve, but so as to leave a minimal amount of clearance, and that the length of the driver is at least equal to the length of the entire sleeve. It is then also advantageous that the effective length of the wedge surface on the driver is at least equal to the diameter of the sphere.

It is further advantageous, in some instances, to provide that the wedge surface is comprised of two sections which are angularly disposed to one another and separated by an apex or ridge which, in turn, extends in the major direction of the inclination. Such a driver can substantially enhance the action between it and the sphere and, accordingly, the anchoring effect of the wall plug anchor assembly in the material.

Another advantageous embodiment is achieved when the driver is the particular securing element that is to be disposed and secured in the sleeve, for example a nail, which can have a head portion and which can be driven, prior to anchoring the dowel, through the construction component, e.g. a piece of lumber, plank, or beam.

It is also within the scope of the invention that from the free end of the securing element, e.g. from the front face of its head, a spike formation, for example a threaded shaft, emanates at which subsequently one can secure an additional construction component by means of a nut or the like in the desired fastening manner. A driver equipped with such an extension, for example a threaded shaft extension, however, cannot be driven in by direct hammering strokes on its free end. Thus, for such an assembly there may be required a special auxiliary tool which surrounds the extension with sufficient clearance and which is supported on the actual head of the driver.

When the driver also serves as the securing element to be arranged in the sleeve, it is also advantageous that it includes in the section next to the wedge surface or surfaces several circumferential depressions. These depressions can be grooves, valleys and like notches—separated by respective ridges and the like formations—for the provision of retention or capture formations for the sphere which is being displaced from the longitudinal central axis of the sleeve. The respective interaction and anchoring of driver and sphere is substantially enhanced by such a configuration.

It is also of advantage that the wall plug anchor assembly can be produced in a very simple manner using a piece of hollow cylindrical tubing and at which the head or crown is formed by coining to provide a flared end.

The sleeve can preferably be formed with two diametrically arranged longitudinal slots, thereby leaving two legs for flaring and anchoring in the surrounding material.

BRIEF DESCRIPTION OF THE DRAWING

The above and other objects, features and advantages will become apparent from the following description, reference being made to the accompanying drawing in which:

FIG. 1 is a side elevation of the three components of a first wall plug anchor assembly according to the invention;

FIG. 2 is a view in the direction of arrow II in FIG. 1;

FIG. 3 is a cross-sectional view of three successive steps to anchor the wall plug anchor assembly according to FIG. 1 in a concrete component;

FIG. 4 is a side elevation of the three components of a second wall plug anchor assembly according to the invention;

FIG. 5 is a view in the direction of arrow V in FIG. 4; and

FIG. 6 is a cross-sectional view of four successive installation phases of the wall plug anchor assembly according to FIG. 4 in a concrete component.

SPECIFIC DESCRIPTION

FIG. 1 shows the basic components of a tubular wall plug anchor assembly 1. The wall plug anchor assembly 1 can be inserted into pre-formed components, such as bricks, blocks and plates. These components can be made of gas-expanded and light concrete, cellular concrete or clay, or silicate-type concrete, and the like.

The wall plug anchor assembly 1 comprises a sleeve 2 made from a piece of hollow tubing. The head end or crown 3 is unitary with the sleeve 2, and it can be made by a punching step to provide the flare as shown. Reference numeral 4 designates the tail end of the wall plug anchor assembly 1.

Two diametrically arranged slots 5 are cut into the sleeve 2. The slots 5 extend from the tail end 4, and preferably they extend along the majority of the sleeve length 13; for example, it may be preferred that they extend over two thirds of the length 13 of the sleeve 2.

The sleeve 2 of the tubular wall plug anchor assembly 1 is advantageously made of a metallic pipe material, preferably a steel pipe or tubing piece. As desired, however, it can be made of a strong and resistive plastic or synthetic-resin material, particularly a polyamide.

A further component of the wall plug anchor assembly 1 is a sphere 6 of a distortion-resistant shape retentive material, for example, hardened steel. The diameter 15 of the sphere 6 is related to the inner diameter of the sleeve 2 such that a minimal radial clearance exists between the sphere 6 and the sleeve 2.

Wall plug anchor assembly 1 also includes a rod-like driver 7 which can have the shape of a nail. Thus, it has a generally cylindrical shaft portion 8 with a diameter adapted to the inner diameter of the sleeve 2. The driver has a disc-shaped head 9 which is formed by a coining or heading process.

The opposite or tail end of the shaft portion 8 is wedge-shaped or tapered when considered in the side elevation of FIG. 1. Thus, there is provided a wedge surface 10 which extends at an acute angle with respect to the longitudinal central axis of the shaft portion 8.

In the embodiment of the wall plug anchor assembly 1 according to FIG. 1, the wedge or knife surface 10 extends over the full width or cross-sectional dimension of the shaft portion 8 and forms a lower, linear cutting edge 11 at the bottom terminus by extending transversely with respect to the longitudinal axis of the shaft portion 8, as shown in FIG. 2.

The full length 12 of the shaft portion 8 of the driver 7 is at least equal to the full length 13 of the sleeve 2. It is preferred, however, that the full length 12 of the shaft portion 8 of driver 7 is such that the driver 7 can be used per se as a securing element for construction components which are to be anchored by the tubular wall plug anchor assembly 1 in the respective body of concrete material.

FIG. 1 also shows that the wedge surface 10 extends along the shaft portion 8 of the driver 7 over a length or height 14 which length is at least equal to the diameter 15 of the sphere 6.

The sphere 6, as well as the driver 7, can be associated with the sleeve 2 of the wall plug anchor assembly 1 as loose components of a kit. It is preferred, however, to secure the sphere 6 against loss in the sleeve 2 by means of an adhesive in such a position that it is secured therein at a relative small distance beneath the head portion 3.

Instead of an adhesive, one can also employ circumferential deformations of the sleeve 2 to temporarily secure the position of the sphere 6.

For installation of the tubular wall plug anchor assembly 1 in components of gas-expanded or light concrete, or the like compositions, generally identified by reference numeral 16, initially only the sleeve 2 is placed against the wall of the component 16. By means of hammer strokes against the head portion 3, the sleeve 2 is driven into the component 16 until its head portion 3 is abutting at the wall as is indicated on the left-hand representation of FIG. 3.

During the driving-in process the interior of the sleeve 2 is filled with the concrete material 17, as is also indicated in FIG. 3, starting from the bottom and gradually reaching the crown 3.

In the case in which the sphere 6 has been already placed in the sleeve 2, and fixed as to position therein, as is indicated in the left-hand representation in FIG. 3, the driving-in process of the sleeve 2 has already achieved a certain compaction of the concrete material 17.

After the sleeve 2 has been driven-in, the rod-like driver 7 is moved from the exterior through the open end of the head portion 3 of the sleeve 2, as is indicated in the central representation of FIG. 3. Thus, initially the forward end, namely the cutting edge 11 which is adjacent to or part of the wedge surface 10, contacts the sphere 6 in a lateral or off-centered manner.

The sphere 6 is advanced upon imparting hammer strokes to the head 9 of the driver 7. The advancement is initially through the rearward, unslotted, or solid portion or extent 18 of the sleeve 2, and thence through the forward portion 19 which includes the slots 5. The advancement is carried out under continuous compaction of the respective concrete material present within the sleeve 2. This material can be gas-expanded or light concrete, generally identified by reference numeral 17.

When the sphere 6 has entered the slotted portion 19, the sphere 6 which acts against the concrete mass 17 can gradually slide along the wedge surface 10 of the rod-like driver 7. This will cause a displacement of the sphere 6 in the sleeve 2 away from the original co-incidental position with the longitudinal axis of sleeve 2 into a position in which the spreading of the legs left by the slots 5 is commenced. This is indicated in the right-hand representation of FIG. 3. Thus, the lateral or side-ways deflection of the sphere 6 which is achieved by the wedge surface 10 of the driver 7, causes the sleeve 2 to be flared in the slotted portion 19. This will cause a positive anchoring of the respective legs in the concrete body 16, as is also shown in the right-hand representation of FIG. 3. As mentioned, the concrete can be an gas-expanded or light concrete composition.

From the right-hand representation of FIG. 3, it can be seen that the rod-like driver 7 is in a driven-in position, in which the sphere 6 is respectively abutting at the wedge surface 10 and at the flared leg portion of the sleeve 2.

Nevertheless, the overall length 12 of the driver 7 can be greater than the overall length 13 of the sleeve 2. In such a configuration, the driven-in position of the wedge surface 10 is such that it has passed the sphere 6, and the respective stem portion of the driver 7 is in contact with the sphere 6. This achieves an optimum of anchoring effort of the wall plug anchor assembly 1 in the particular body 16 of gas-expanded or light concrete. Tests have shown that the anchoring force or strength is approximately up to 2000N.

It is feasible to use the driver 7 exclusively for the described anchoring, in which the cooperation of the wedge surface 10 and the sphere 6 achieves the optimum flaring or anchoring, in the gas-expanded or light concrete, of the forward, slotted portion 19 of the sleeve 2. The driver 7 can then be retracted from the sleeve 2 and a different securing element can be introduced. Such securing elements can include nails which can be hammered-in with respective hammer strokes to achieve a positive fit. As well, a screw can be introduced which can cut screw-threads into the interior wall of sleeve 2 in self-tapping fashion, at least in the solid portion 18 of the sleeve 2.

Also, the driver 7 can serve as the securing element, and for this embodiment of the invention the circumference of the driver 7 can be formed with circumferentially disposed depressions 20, for examples valleys, grooves, furrows and the like formations - and associated ridges and the like projecting formations. These provide detent-type holders for the sphere 6 that has been removed from its co-incidental position with the longitudinal central axis of the sleeve 2.

FIGS. 1 and 2 of the drawing show the formations 20 in dash-dot outline.

FIGS. 4 to 6 of the drawing show a modified wall plug anchor assembly 21.

The sleeve 22 of this embodiment is generally similar to that of sleeve 2 of wall plug anchor assembly 1 in FIGS. 1 to 3. Thus, it has a head 23 and longitudinal slots 25 extend from the free or tail end 24.

The driver 27 in this embodiment is quite distinct from the embodiment of the driver 7 described in the foregoing with reference to FIGS. 1 to 3. This driver 27 has a projection or extension 28a which emanates at the head or annular shoulder 29. The extension 28a can have exterior or male screwthreads.

As well, the lower or driving end of the driver 27 is equipped with a pair of lateral wedge surfaces, 30a and 30b, respectively. These two wedge surfaces are inclined from a common ridge or crest 30c and are tapered, as is shown in FIG. 5, to form a point or spike tip 31, as compared to the cutting edge or straight edge 11 as has been described in the previous embodiment.

FIGS. 4 and 5 also show that the rod-like driver 27 has an effective length 32 which is greater than the overall length 33 of the sleeve 22 of wall plug anchor assembly 21.

The two wedge surfaces 30a and 30b with their common crest 30c extend over a portion 34, and the length of this is at least equal to the diameter 35 of the sphere 26 which is to be introduced into the sleeve 22.

With reference to the sequences shown in FIG. 6, the sleeve 22 of the wall plug anchor assembly 21 is initially driven into the concrete body 36 without the sphere 26, until the annular shoulder or head 23 abuts the adjacent surface. During this process, the interior of the sleeve 22 is filled with the respective concrete composition 37, i.e. gas-expanded or light concrete.

Next, the sphere 26 is introduced through the open or head end 23 of the sleeve 22 as is shown in FIG. 6 in the second step from the left. Following this, one can also introduce the driver 27 at this end, and hammer strokes can be applied to move the driver 27 through the sleeve 22, as is indicated in the third step from the left in FIG. 6.

However, for protection of the extension 28a, an intermediate tool 41 is used which has a central, longitudinal passage or bore 42 which is of sufficient depth to accommodate the extension 28a, i.e. bore 42 has a length which is greater than the length of the threaded extension 28a. The lower terminus or face 43 of the auxiliary tool 41 is adapted to be seated on the head 29 of the driver 27, and hammer strokes can be applied at the head or upper terminus 44 of the auxiliary tool 41 to move the driver 27.

The sleeve 22 of this wall plug anchor assembly 21 has a rearward, unslotted, or solid portion or length 38, as well as a slotted portion or length 39, the latter including the longitudinal slots 25. The slotted portion 39 has a length which is greater than the length of the solid portion 38.

On introduction of the driver 27 into the sleeve 22, initially the tip 31 provided by the wedge surfaces 30a and 30b and the crest 30c contacts the sphere 26. Thus, the sphere 26 can be advanced from the upper, forward, or unslotted portion 38 in the direction of the portion 39 which includes the longitudinal slots 25. Advancement of the sphere 26 gradually compacts the gas-expanded or light concrete material 37 collected in the interior of the sleeve 22. As the sphere is moved to the bottom or tail end of the sleeve 22 it is gradually removed from its central position in which its center is co-incidental with the central longitudinal axis of the sleeve 22, into a position of lateral deflection or displacement. Any one of the two wedge surfaces 30a and 30b at the forward end of the shaft portion 28 car slide along the sphere 26 and impart the lateral deflection to the sphere 26 and thereby cause the associated flaring and anchoring of the legs left by the longitudinal slots 25, namely, the portion 39 of the sleeve 22. This flaring action is indicated in the two right-hand steps in FIG. 6.

The particular driving forces imparted on the driver 27 to move it through the sleeve 22 in resistance to the concrete material 37 in the interior of the sleeve 22 can lead to a deflection by the wedge surfaces 30a and 30b of the sphere 26 so as to cause a bulge 45 in the wall of the sleeve 22, particularly in the portion 39. Such a deformation will be in addition to the anchoring effect achieved by the flaring or spreading of the sleeve legs in the respective concrete composition 36.

The rod-like driver 27, as suggested in FIGS. 4 to 6, can be used as the spreading tool for the sleeve 22 in the concrete body 36. However, it can also serve as the securing element per se. For this use, the circumference of the shaft portion 28, commencing from the wedge surface 30a and 30b, can be formed with circumferential grooves and the like detent-formations 40 and associated ridges, projections, and the like formations. The grooves can be used as retention sites for the sphere 26 that is to be displaced from its initial central position, and the respective formations thereof can provide additional securement of the shaft portion 28 within the sleeve 22.

We claim:

1. A tubular wall plug anchor assembly which can be inserted into gas-expanded concrete, light concrete, and the like material, comprising:

a hollow longitudinal sleeve having an initial constant inner diameter, said sleeve having an upper unslotted portion and a lower slotted portion, said lower slotted portion defined by a plurality of longitudinal slots extending upwards from an open end of said sleeve;

a head portion unitary with said sleeve, said head portion having a diameter greater than an outer diameter of said upper and lower portions;

a spreading body adapted to be driven into said sleeve, said body being a single sphere for flaring said legs in anchoring effect, said sphere being adapted to be inserted from said head portion of said sleeve into said unslotted portion thereof, and also advanced into said slotted portion; and a driver, said driver having an end adapted to contact said spreading body and to drive said spreading body against any concrete material which has entered into said open end and into said unslotted portion of said sleeve, said end of said driver comprising an inclined wedge surface along and by which said single sphere at least in said slotted portion of said sleeve can be laterally displaced out of an initial position, which is co-incident with said central longitudinal axis, towards the respective sleeve walls away from said axis in a wedge-like movement.

2. The wall plug anchor assembly defined in claim 1 wherein said sleeve is made of a metallic material.

3. The wall plug anchor assembly defined in claim 1 wherein said sleeve is made of a synthetic-resin material.

4. The wall plug anchor assembly defined in claim 1 wherein said sphere is received in said sleeve with a predetermined radial clearance.

5. The wall plug anchor assembly defined in claim 1 wherein said wedge surface of said driver extends over at least half of the cross section of said driver.

6. The wall plug anchor assembly defined in claim 1 wherein said driver has an outer diameter which allows a predetermined amount of radial clearance with respect to an inner diameter of said sleeve, and an effective length of said driver is at least equal to an effective length of said sleeve.

7. The wall plug anchor assembly defined in claim 1 where an effective height of said wedge surface is at least equal to a diameter of said sphere.

8. The wall plug anchor assembly defined in claim 1 wherein said wedge surface is comprised of two sections which are angularly disposed to one another and are separated by a common ridge.

9. The wall plug anchor assembly defined in claim 1 wherein the driver is a nail having a head portion of said driver.

10. The wall plug anchor assembly defined in claim 1 wherein said driver has a projecting formation extending from said head of said driver portion in a direction opposite from said wedge end.

11. The wall plug anchor assembly defined in claim 10 wherein said projecting formation has exterior screw-threads.

12. The wall plug anchor assembly defined in claim 1 wherein said driver at least in its portion adjacent to said wedge surface is formed with circumferentially disposed depressions to serve as detent-type holders for said sphere.

13. The wall plug anchor assembly defined in claim 1 wherein said head portion of said sleeve is a collar formed at said sleeve by a coining operation.

14. The wall plug anchor assembly defined in claim 1 wherein said sleeve has at least two diametrically arranged longitudinal slots.

15. The wall plug anchor assembly defined in claim 1 wherein said sphere is secured at said head portion of said sleeve by means of an adhesive.

* * * * *